United States Patent Office 2,771,927
Patented Nov. 27, 1956

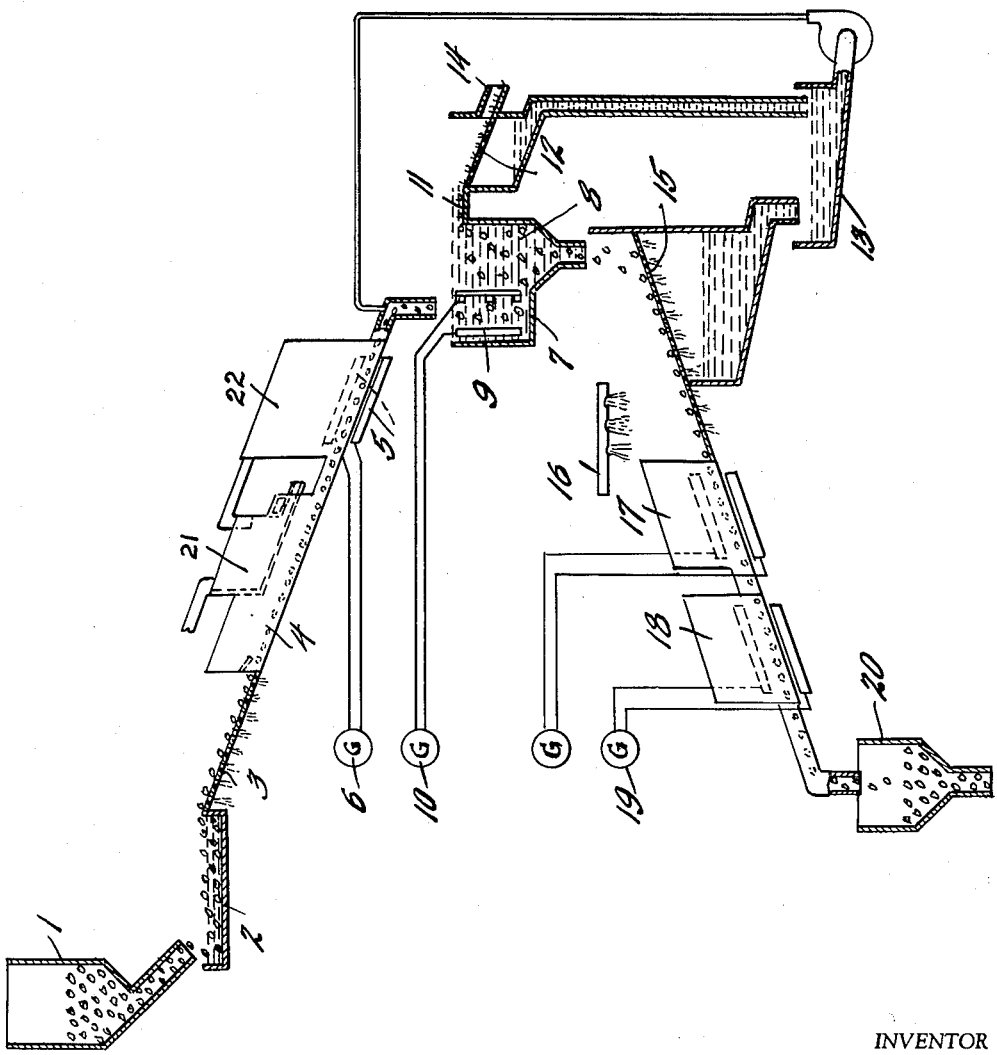
INVENTOR
OTTO THANING

2,771,927

PROCESS FOR THE EXTRACTION OF THE CONTENTS OF NUTS, FRUITS, OR LIKE OBJECTS

Otto Thaning, Eikenhof, Transvaal,
Union of South Africa

Application September 2, 1953, Serial No. 378,007

10 Claims. (Cl. 146—227)

This invention relates to a method of shelling, or extraction of the solid and/or liquid contents, of nuts, seeds, fruits, roots and like objects of vegetable origin.

It is known to subject nuts and other objects of vegetable origin to an electric or electro-magnetic field preferably of high frequency whereby the liquid contents are caused to vaporize suddenly thereby bursting the shell or outer layer to separate it from the inner portion.

It has been found that with certain nuts and other objects of vegetable origin, that this method cannot be applied, due to the fact that they have porous or perforated skins or shells through which the vaporised liquid escapes at such a rate, that insufficient pressure can be built up within the outer layer to cause it to burst. This is the case for example with cashew nuts which often have a perforation at the point where they were detached from the stem, or almonds which have a somewhat porous shell.

This difficulty is overcome, according to this invention which comprises the steps of subjecting the objects to a reduced temperature sufficiently low to solidify or freeze their outer fluid constituents and seal the exteriors thereof, and thereafter heating them by an electric or electro-magnetic field of sufficient intensity to cause explosive vaporization of the liquid contents of said objects thereby bursting or detaching the exteriors from the internal constituents. Normally, prior to heating, the objects are immersed in a fluid which is absorbed or injected under pressure into the exteriors or outer layers to become a constituent part thereof, and after solidification acts both to seal and loosen the exteriors or outer layers.

According to further features of the invention the objects and particularly those having a laminated structure are subjected, after heating, to a high frequency vibratory movement preferably in the sonic or supersonic frequency range to detach the internal layers or adhering parts. The various parts may then be separated by flotation.

As an example of this invention cashew nuts may first be soaked in a 3% solution of salt in water for some hours, then subjected to progressive refrigeration down to a temperature of about minus 20° centigrade for a few minutes, when they become covered with a hard non-porous crust and the outer shell becomes loosened by the expansion of the frozen liquid absorbed in the shell. The nuts are subsequently passed through an electric high frequency field of about 15 mc./sec. whereby the liquid between the shell and the nut meat vaporizes practically instantaneously and bursts off the frozen outer shell of the nut. If the nuts are then submerged in a saline solution acting as a carrier for sonic waves of approximately 27,000 C. P. S. the thin inner rind or shell tissue surrounding the nut meat is loosened and detached and may be removed by flotation or other suitable means.

The invention will be clearly understood with reference to the accompanying drawing which illustrates diagrammatically a process for the continuous shelling, cleaning and roasting of cashew nuts and like objects having an outer shell and inner rind which it is necessary to remove.

As shown in the drawings there is provided a storage bin 1 whence the cashew nuts are fed by gravity or on a conveyor belt to soaking vats 2, from where they pass by gravity over dripping trays 3 into the refrigerator 4, and thence through an electric high frequency field between plates 5, connected to a high frequency generator 6. In the high frequency field the shells or outer layers burst off and are, together with the nut meat or core, dropped into a vat 7, containing a carrier medium 8 for sonic waves energised for example by piezo-electric crystals 9, subjected to a high frequency electric field supplied by a generator 10, or by iron cores in a high frequency electro-magnetic field, depending upon whether higher or lower frequencies of the sonic waves are required.

The sonic waves loosen or remove the inner skins or tissues surrounding the nut meat or core, the separation of the latter from the unwanted parts being made, for instance by flotation. The sonic wave carrier liquid is chosen with suitable physical properties such as specific weight, viscosity, and the like for this purpose, so that the rinds or skins emerge at one side 11 pass over dripping trays 12, where the carrier liquid is recovered and are led to storage tank 13, whilst the rind and other waste material is discharged at outlet 14. The nut meat or core is similarly separated out on dripping trays 15.

Abrasives or polishing agents may be added to the carrier liquid so as to cause the nut meats or cores to emerge in a polished condition, the latter then being passed under washing sprays 16, and drier 17, before passing through the roaster 18, fed from the generator 19. The nut meats or cores may then be salted or otherwise treated, as required, and finally deposited in the storage bins 20 from where they are taken to the packing tables.

The drying and roasting may be carried out by means of a high frequency electric field, so that the heating, sonic treatment and drying zones may be combined into a single high frequency electric and sonic wave section.

Fluids which are given off by the objects treated in various zones may be recovered and utilised, and the refrigerating, high frequency and sonic zones arranged specifically for this purpose. In the drawing for example an arrangement is indicated at 21 whereby vapours given off in the high frequency heater 22 are condensed by refrigeration and drawn off.

What I claim as new and desire to secure by Letters Patent is:

1. A process for the treatment of objects of vegetable origin having an outer layer constituent covering internal constituents and both having a liquid content, to separate the constituent parts thereof, comprising the steps of subjecting the objects to a reduced temperature sufficiently low to solidify the liquid content of their outer layer constituents and seal the outer layer thereof, and thereafter heating them by an electrically generated high frequency field of sufficient intensity to cause explosive vaporization of the liquid contents of the internal constituents of said objects, thereby bursting and detaching the outer layer, from the internal constituents.

2. A process for the treatment of objects of vegetable origin having a liquid content, to separate the constituent parts thereof, comprising the steps of introducing a fluid into the exterior of said objects, subjecting to a temperature sufficiently low to solidify said fluid and seal said exterior and thereafter heating them by an electrically generated high frequency field of sufficient intensity to cause explosive vaporization of the inner liquid contents of said objects thereby bursting and detaching the exterior from the internal constituents.

3. A process for the treatment of objects of vegetable origin having a liquid content, to separate the constituent parts thereof, comprising the steps of immersing the objects in a liquid to impregnate the exterior thereof, removing the objects from the liquid, subjecting them to refrigeration to solidify the impregnating layer of liquid and seal the exteriors of the objects, and thereafter heating them by an electrically generated high frequency field of sufficient intensity to cause explosive vaporization of the inner liquid contents of said objects thereby bursting and detaching the exteriors from the internal constituents.

4. A process for the treatment of objects of vegetable origin having an outer layer constituent covering internal constituents and both having a liquid content, to separate the constituent parts thereof, comprising the steps of subjecting the objects to a reduced temperature sufficiently low to solidify the liquid contents of their outer layer and seal the exterior thereof, heating the objects in an electrically generated high frequency field of sufficient intensity to cause explosive vaporization of the liquid contents of the internal constituents of said objects thereby bursting and detaching the outer layer from the internal constituents and thereafter passing said internal constituents through a carrier medium wherein they are subjected to a high frequency mechanical vibratory movement to separate adhering parts thereof.

5. A process in accordance with claim 4 in which the objects are polished when passing through the carrier medium by means of polishing agents contained in said medium.

6. A process in accordance with claim 4 in which the objects after passing through said carrier medium, are subjected to a flotation separation process.

7. A process for the treatment of objects of vegetable origin having an outer layer constituent covering internal constituents and both having a liquid content, to separate the constituent parts thereof, comprising the steps of subjecting the objects to a reduced temperature sufficiently low to solidify the liquid contents of their outer layers and seal the exteriors thereof, heating the objects in an electrically generated high frequency field of sufficient intensity to cause explosive vaporization of the liquid contents of said objects thereby bursting and detaching said exteriors from the internal constituents and collecting and condensing the liquid vaporised during the heating of said objects.

8. A process for the treatment of objects of vegetable origin having a liquid content, to separate the constituent parts thereof, comprising the steps of immersing the objects in a liquid to impregnate the exteriors thereof, removing the objects from the liquid, subjecting them to refrigeration to freeze the impregnating layer of liquid and seal the exteriors of the objects, heating the objects in an electrically generated high frequency field of sufficient intensity to cause explosive vaporization of the inner liquid contents of said objects thereby bursting and detaching the exteriors from the internal constituents, passing said objects through a liquid carrier medium wherein they are subjected to a high frequency mechanical vibratory movement to separate adhering parts thereof, and thereafter subjecting said objects and the separated parts thereof to a flotation separation process.

9. A process for the treatment of nuts having a shell and kernel, both having a liquid content, to separate the shell from the kernel comprising the steps of subjecting the nuts to a reduced temperature sufficiently low to freeze the liquid contents of the shell and seal the shells of said nuts, and heating the sealed nuts in an electrically generated high frequency field of sufficient intensity to cause explosive vaporization of the liquid contents of the kernels of said nuts, thereby bursting and detaching the shells from the kernels.

10. A process for the treatment of nuts having a liquid content, to separate the constituent parts thereof comprising the steps of impregnating the shells of the nuts by a liquid, subjecting the nuts to refrigeration to freeze the impregnating liquid and seal the shells of said nuts, heating the sealed nuts in an electrically generated high frequency field of sufficient intensity to cause explosive vaporization of the inner liquid contents of said nuts, thereby bursting and detaching the shells therefrom, passing the nuts through a liquid carrier medium wherein they are subjected to a high frequency mechanical vibratory movement to separate the kernels from adhering layers, and thereafter drying and roasting the separated kernels.

References Cited in the file of this patent

UNITED STATES PATENTS

| | | |
|---|---|---|
| 2,508,728 | Stansbury | May 23, 1950 |
| 2,601,421 | Thaning | June 24, 1952 |
| 2,661,784 | McMillan | Dec. 8, 1953 |